(12) United States Patent
Scheffler et al.

(10) Patent No.: US 6,909,466 B1
(45) Date of Patent: Jun. 21, 2005

(54) CIRCUIT FOR FRAME RATE CONVERSION USING A MOTION-ADAPTIVE METHOD

(75) Inventors: Günter Scheffler, München (DE); Markus Schu, Erding (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/806,603

(22) PCT Filed: Sep. 15, 1999

(86) PCT No.: PCT/DE99/02938

§ 371 (c)(1),
(2), (4) Date: Jul. 13, 2001

(87) PCT Pub. No.: WO00/19713

PCT Pub. Date: Apr. 6, 2000

(30) Foreign Application Priority Data

Sep. 30, 1998 (DE) .......................................... 198 44 937

(51) Int. Cl.[7] .............................................. H04N 7/01
(52) U.S. Cl. ...................... 348/459; 348/447; 348/910
(58) Field of Search ................................ 348/784, 781, 348/782, 459, 441, 699, 700, 447, 910; 353/98, 95, 37, 34; 359/298, 489, 301, 629, 485; 349/7–9; 382/266–269, 264

(56) References Cited

U.S. PATENT DOCUMENTS

| | | | | | |
|---|---|---|---|---|---|
| 5,471,252 | A | * | 11/1995 | Iu .............................. | 348/699 |
| 5,699,499 | A | * | 12/1997 | Kawada et al. ............. | 345/475 |
| 5,708,480 | A | | 1/1998 | Bromba et al. | |
| 5,793,435 | A | * | 8/1998 | Ward et al. .................. | 348/448 |
| 5,963,262 | A | * | 10/1999 | Ke et al. ...................... | 348/447 |
| 6,181,382 | B1 | * | 1/2001 | Kieu et al. ................... | 348/459 |
| 6,385,245 | B1 | * | 5/2002 | De Haan et al. ........ | 375/240.16 |

FOREIGN PATENT DOCUMENTS

| | | |
|---|---|---|
| DE | 32 43 444 A1 | 4/1988 |
| DE | 43 27 733 C1 | 6/1994 |
| EP | 0 370 500 A | 5/1990 |

\* cited by examiner

*Primary Examiner*—Victor R. Kostak
(74) *Attorney, Agent, or Firm*—Peter F. Corless; Steven M. Jensen; Edwards & Angell, LLP

(57) ABSTRACT

The circuit includes a motion detector including a first device for producing pixel motion signals, which have a first state for each pixel which is found to have moved and a second state for each pixel which is found to have been stationary, and a second device for correcting the pixel motion signals in order to produce motion values in such a manner that a state of a pixel which differs from matching states of adjacent pixels is ignored.

7 Claims, 8 Drawing Sheets

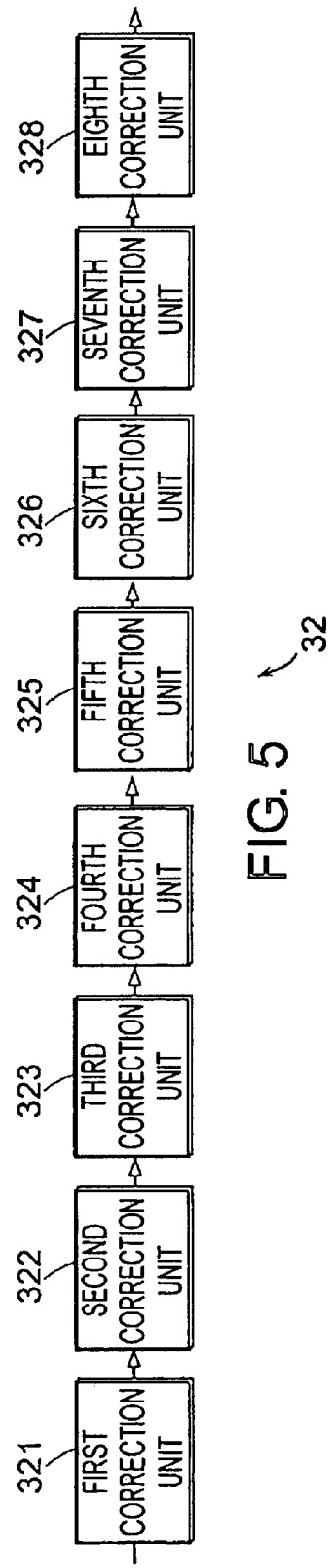
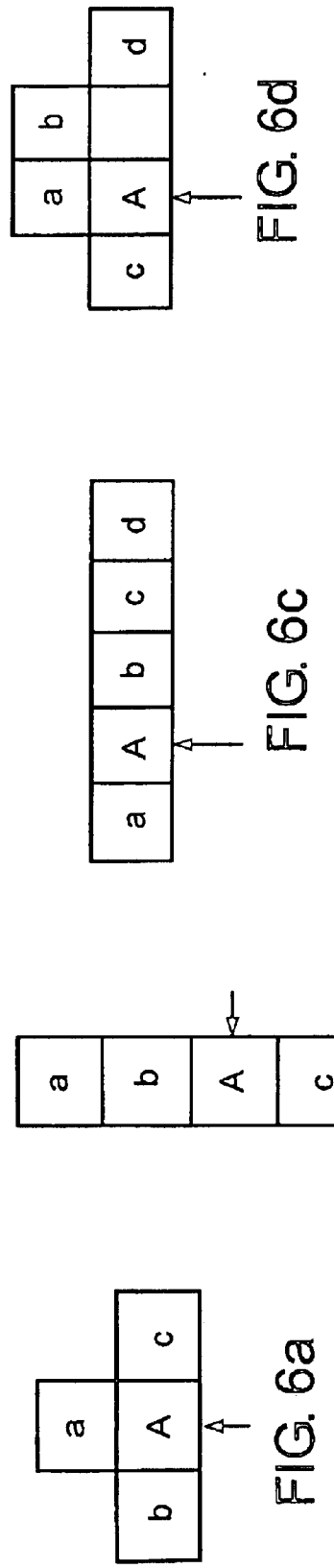
FIG. 5
FIG. 6a
FIG. 6b
FIG. 6c
FIG. 6d

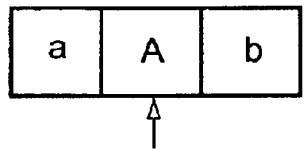
FIG. 6e
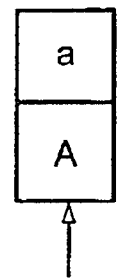
FIG. 6f
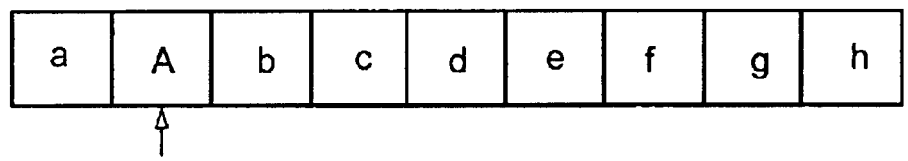
FIG. 6g
FIG. 6h

CIRCUIT FOR FRAME RATE CONVERSION USING A MOTION-ADAPTIVE METHOD

BACKGROUND OF THE INVENTION

The invention relates to a circuit for frame rate (field repetition frequency) conversion in a video signal reproduction device using a motion-adaptive method, having a motion detector for producing motion values of pixels by means of which a device for switching the field sequence with the frame rate being doubled can be actuated.

Circuits of this type are generally used for doubling the field repetition frequency of 50 or 60 Hz in television sets in order in this way to reduce the large-area flickering and to produce a picture which is smoother overall.

For frame rate conversion, a distinction is drawn between static methods on the one hand and motion-adaptive and/or motion-compensating methods on the other hand.

In a static method, the two fields A and B are duplicated and, as shown in FIG. 7, are reproduced either successively (AABB, FIG. 7a) or interleaved (ABAB, FIG. 7b). AABB reproduction has the disadvantage that, although very good motion representation is feasible, edge flickering cannot be reduced in this way, however. In comparison to this, it is possible using the ABAB raster sequence, which in practice means duplication of the frame, to reduce edge flickering in stationary pictures. However, this type of reproduction will not cope with moving pictures.

Furthermore, static methods as shown in FIG. 8 are known which operate with an AA*B*B raster sequence, with the A* and B* fields being calculated using linear or nonlinear methods. For example, the use of median filters is known for this purpose, using which the fields $(A^*)^n$ and $(B^*)^n$ are produced by interpolation of the fields $A^n$ and $B^n$, and $B^n$ and $A^{n+1}$, respectively.

Motion-adaptive and motion-compensating methods differ from static methods by using a motion detector and/or a motion estimator block. The appropriate field interleaving is illustrated in principle in FIG. 9. The motion detector block produces only information about the presence of motion in the picture, while the motion estimator block also determines information about the magnitude and direction of the motion. This information can be used in various ways to improve the frame rate conversion. For example, it is possible to switch between the two static methods mentioned above on a pixel or frame basis, depending on this information.

However, a disadvantage of all these methods is the fact that they are highly complex, particularly if motion-dependent switching between the various raster or field sequences and interpolation are intended to be carried out.

SUMMARY OF THE INVENTION

The invention is therefore based on the object of providing a circuit of the type mentioned initially using which considerably better picture quality, particularly for moving pictures, can be achieved in a relatively simple manner.

This object achieved by a circuit of the type mentioned initially in which the motion detector comprises a first device for producing pixel motion signals, which have a first state for each pixel which is found to have moved and a second state for each pixel which is found to have been stationary, and has a second device by means of which the pixel motion signals are corrected in order to produce motion values in such a manner that a state which differs from matching states of adjacent pixels is ignored.

Particular advantages of this solution are that there is no need for any feedback of the motion values calculated for a previous frame. Furthermore, there is no need for the multiplier which is generally required for the combination of methods with different field sequences, since a simple changeover switch can be actuated by the motion values produced according to the invention. Furthermore, the correction of the pixel motion signals according to the invention results in the production of motion values using which even rapid motion of small objects can be detected and taken into account.

The contents of the dependent claims cover advantageous developments of the invention.

According to these dependent claims, in order to determine the first or second state, the first device preferably has units for producing controlled characteristics for assessment of field differences as a function of line differences, with the motion sensitivity being increased if the line differences are small, and the motion sensitivity being reduced if the line differences are large.

Furthermore, the first device preferably has circuit units for forming line and field differences, with the field differences being assessed by the units for producing controlled characteristics to each of which the line differences are applied and being mapped onto 1-bit signals, and these 1-bit signals being logically combined by means of an OR gate in order to produce the pixel motion signals.

The production of a 1-bit control signal makes it possible to switch in a simple manner between two different field sequences for each pixel.

Furthermore, the second device preferably comprises a first circuit unit for processing the motion signals of each pixel in such a manner that the first state is changed to the second state if the motion signals of all the adjacent pixels are in the second state, with a previously corrected state being used for the processing of a subsequent pixel.

This results in two-dimensional correction of the pixel motion signals using plausibility criteria, and homogenization of picture areas by erasing and filling motion values, and this leads to a further improvement in the picture quality.

BRIEF DESCRIPTION OF THE DRAWINGS

Further details, features and advantages of the invention result from the following description or a preferred embodiment with reference to the drawing, in which:

FIG. 5 shows a block diagram of a second device in the circuit according to the invention;

FIGS. 6a to 6h show pixel corrections to illustrate the production of motion values according to the invention;

DETAILED DESCRIPTION OF THE INVENTION

The invention is based on the knowledge that particularly good picture quality can be achieved if a motion detector provides pixel information about the motion state of a pixel, and this information is used for switching between two different methods, which are each optimized for the motion state. This is particularly appropriate if the stationary picture parts are displayed using a raster sequence (field sequence) ABAB, and the moving picture parts are displayed using the raster sequence AA*B*, as in the explanation in the introduction. Corresponding pixel-dependent switching allows the advantages of both reproduction types to be combined.

Figure 1:
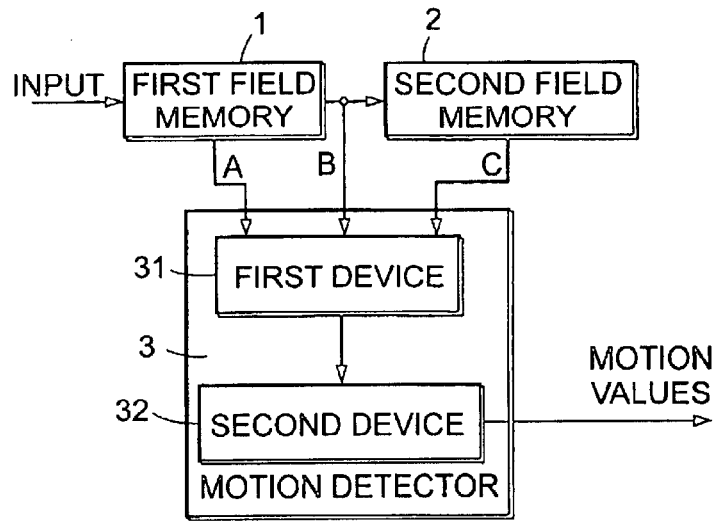
FIG. 1 shows a block diagram of a circuit according to the invention.

FIG. 1 shows a block diagram of a circuit according to the invention. The circuit comprises a first field memory 1, a second field memory 2 connected in series with it and a motion detector 3. The motion detector comprises a first device 31 for producing pixel motion signals, and a second device 32 for producing motion values from them.

The field signals which are applied to the input of the circuit are buffer-stored in the first and the second field memories 31, 32 and are supplied as a first, a second and a third field A, B, C, which follow one another, to the first device 31 in the motion detector 3.

The first device 31 is used to carry out filtering and to form various difference values which are calculated and combined with one another pixel-by-pixel. This results in pixel motion signals which, for each pixel indicate by a first state whether the corresponding pixel should be regarded as moving, and denote by a second state a pixel which should be classified as stationary.

The second device 32 is used to carry out subsequent processing of the states of the pixel motion signals. The aim of this subsequent processing is to homogenize the moving and stationary picture areas. For this purpose, individual small areas in which the pixel motion signals are in the first state and which lie within a relatively large area in which the pixel motion signals are in the second state are eliminated, or are likewise changed to the second state.

Conversely, individual pixels which have been assigned to the second state and which are located within an area with pixels in the first state are assigned to the first state. This results in homogeneous areas which are identified as being moving and correspond to moving picture parts.

Figure 7B:
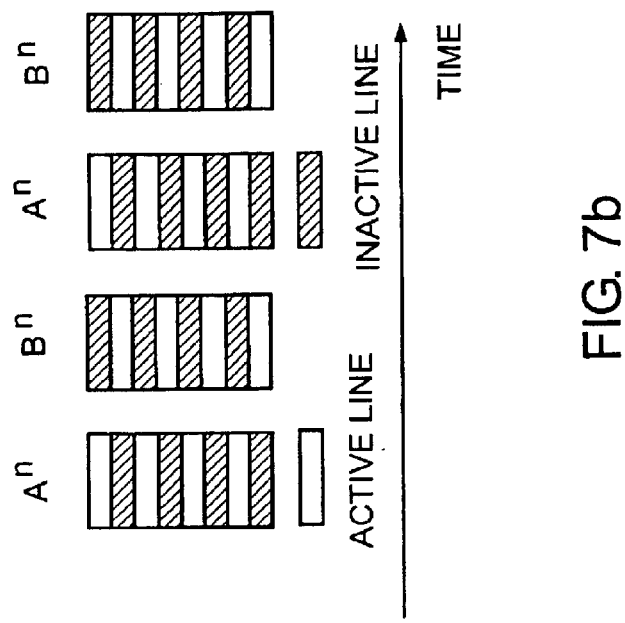
FIGS. 7a, b show various known raster sequences, using which fields are displayed by means of a static method in order to double the frame rate.
Figure 7A:
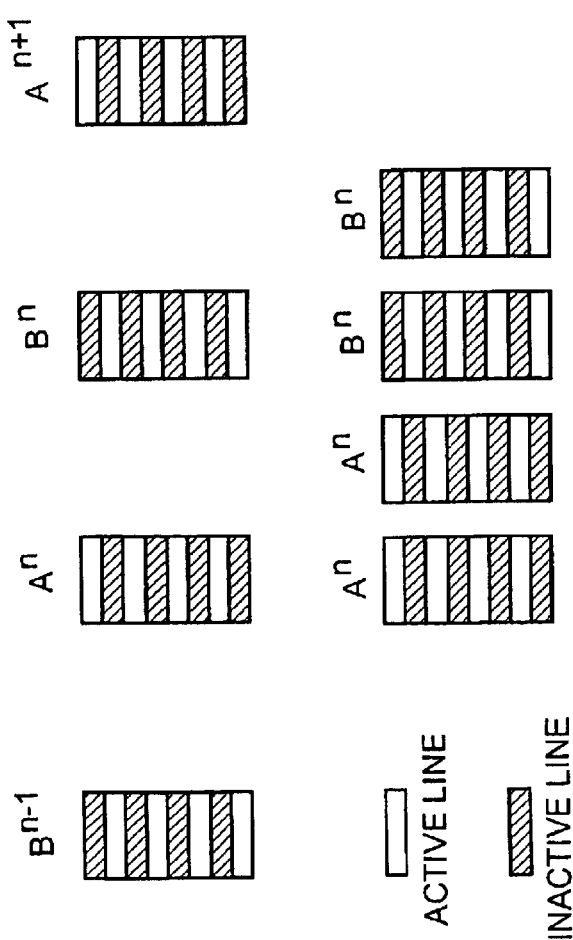
Figure 8:
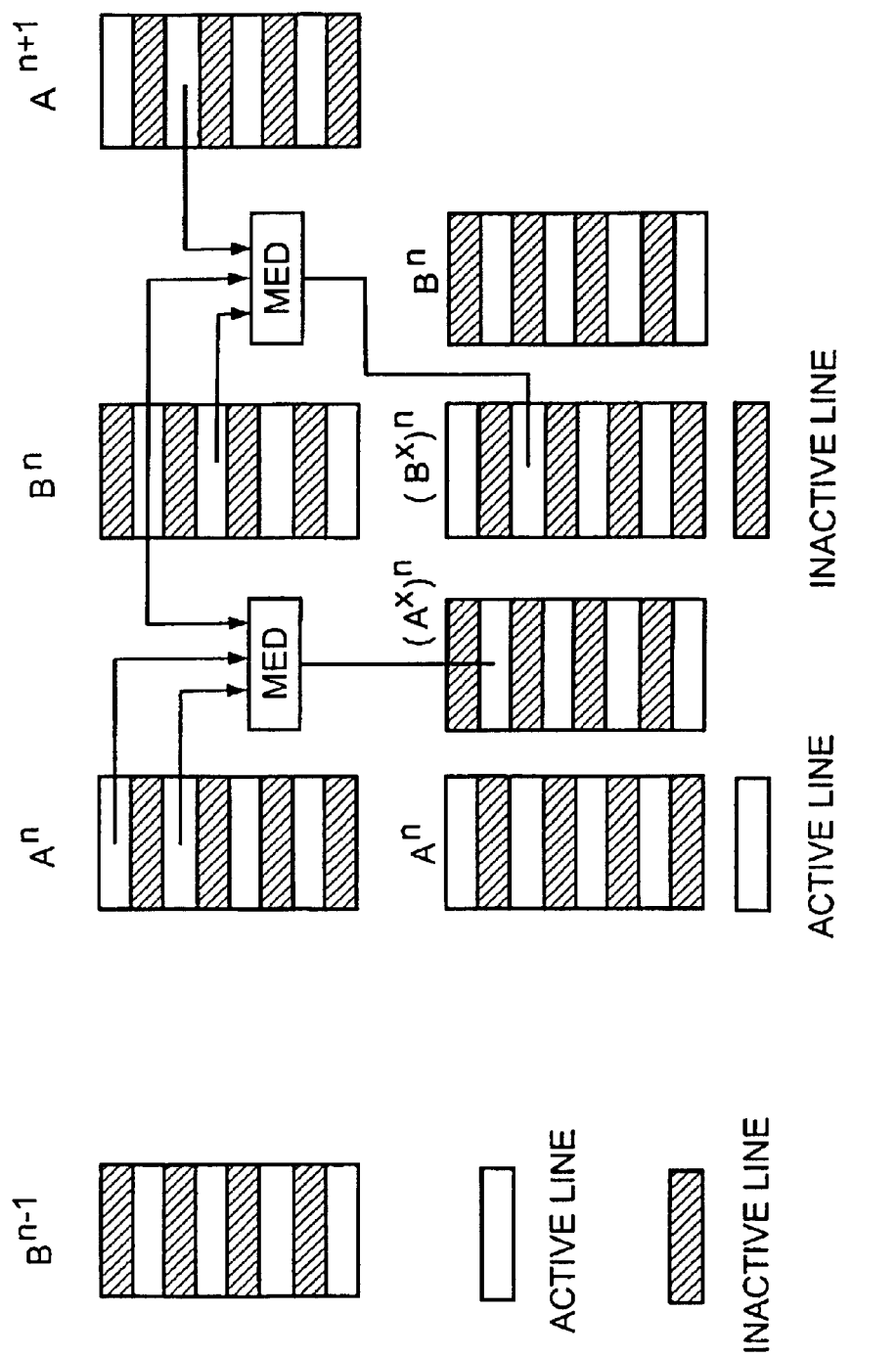
FIG. 8 shows production and display of interpolated fields using a static method.
Figure 9:
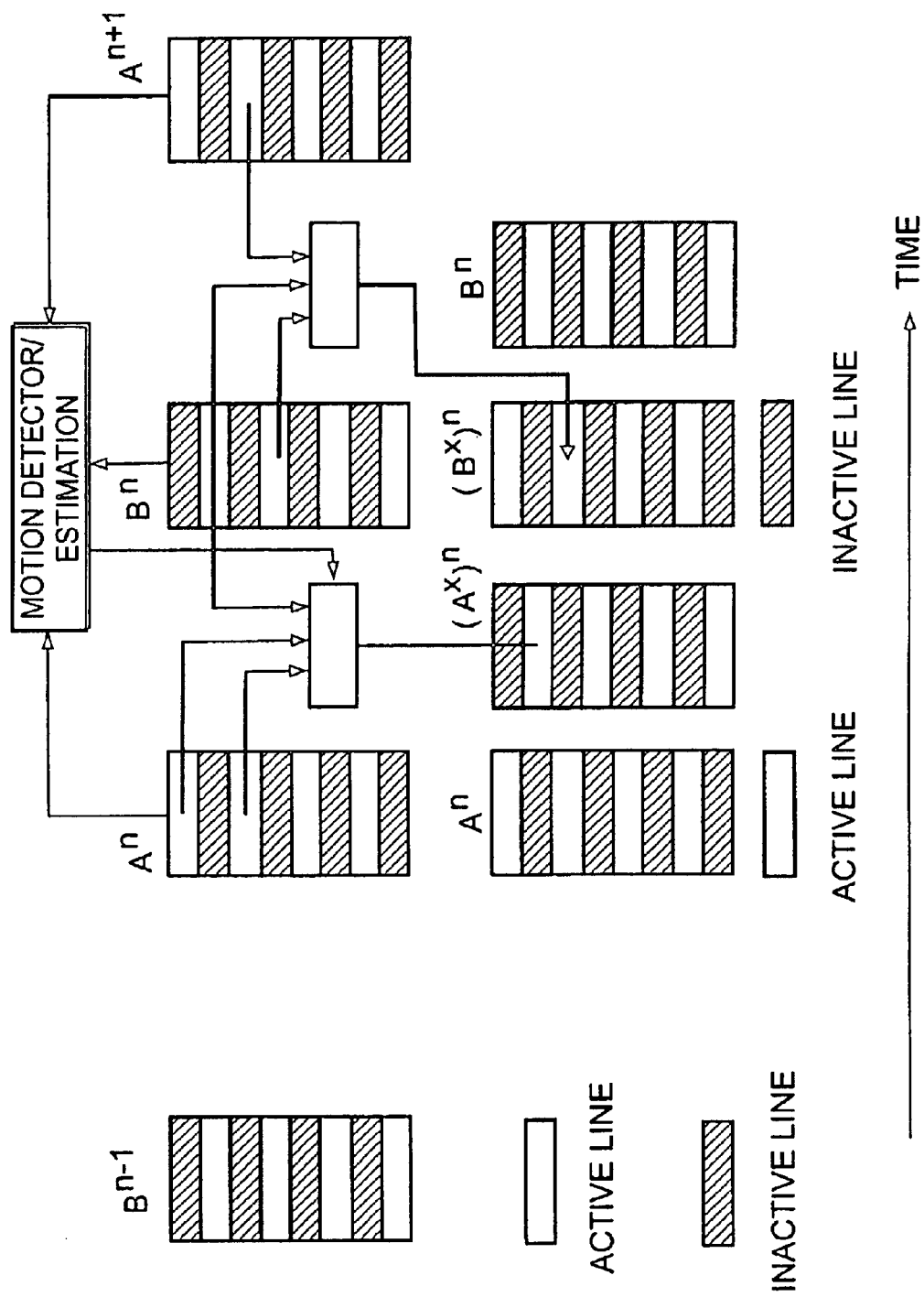
FIG. 9 shows production and display of fields using a motion-adaptive and/or motion-compensating method.

This subsequent processing has the particular advantage that a downstream 100 Hz converter (changeover switch) operates in a stable manner in the sense that it does not switch continuously between the two raster methods explained initially with reference to FIGS. 7a and 7b, which would lead to very disturbing artifacts.

Figure 2:
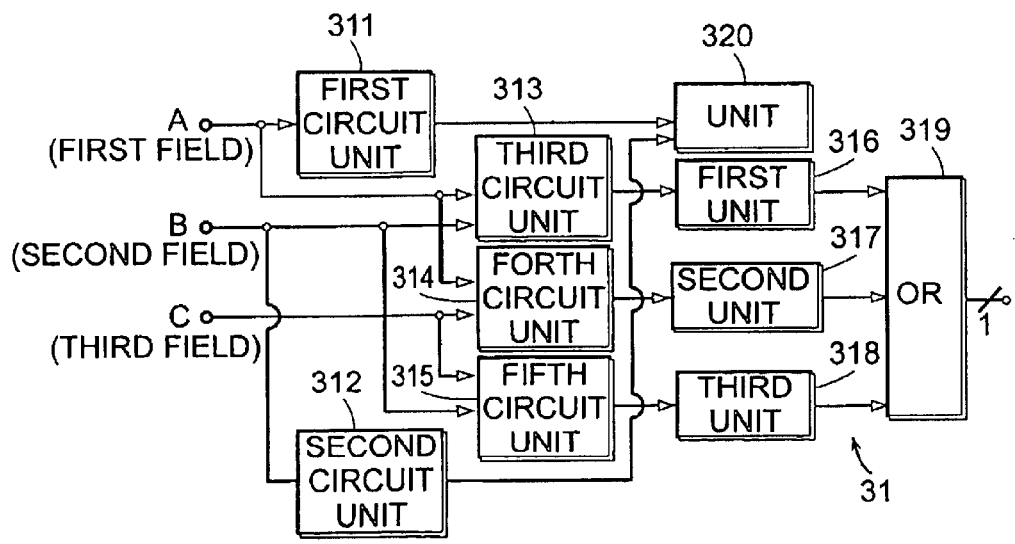
FIG. 2 shows a block diagram of a first device in the circuit according to the invention.

FIG. 2 shows a corresponding block diagram of the first device 31. The first device 31 comprises a first circuit unit 311 to which the first field A is applied, and a second circuit unit 312 to which the second field B is supplied. The two circuit units 311, 312 are each used to form line differences. The unit 320 forms the maximum from the two time differences. Furthermore, a third, a fourth and a fifth circuit unit 313, 314 and 315 are provided, and these are each used to produce frame differences. The first and the second field A, B are applied to the third circuit unit 313. The fourth circuit unit 314 is supplied with the first and the third fields A, C, while the second and the third fields B, C are applied to the fifth circuit unit 315.

The outputs of the third, fourth and fifth circuit units are connected respectively to a first, a second and a third unit 316, 317, 318 in order to produce controlled characteristics. The outputs of these "characteristic controllers" are logically combined using an OR gate 319. The output from the unit 320 is applied to all the characteristic controllers.

The characteristic controllers map the frame differences A–B, A–C and B–C which are produced onto 1-bit signals in order to produce the pixel motion signals. This is done by assessing the frame differences as a function of the line differences from the fields A and B. In this case, the sensitivity is increased if the line differences are small, and the sensitivity is reduced if the line differences are large. The characteristics may expediently be in the form of look-up tables. The maximum of the time differences between the fields A and B controls all the frame differences.

Evaluation of the three different frame differences has therefore been found to be highly advantageous since this allows even small objects which are moving very fast to be detected.

Figure 3:
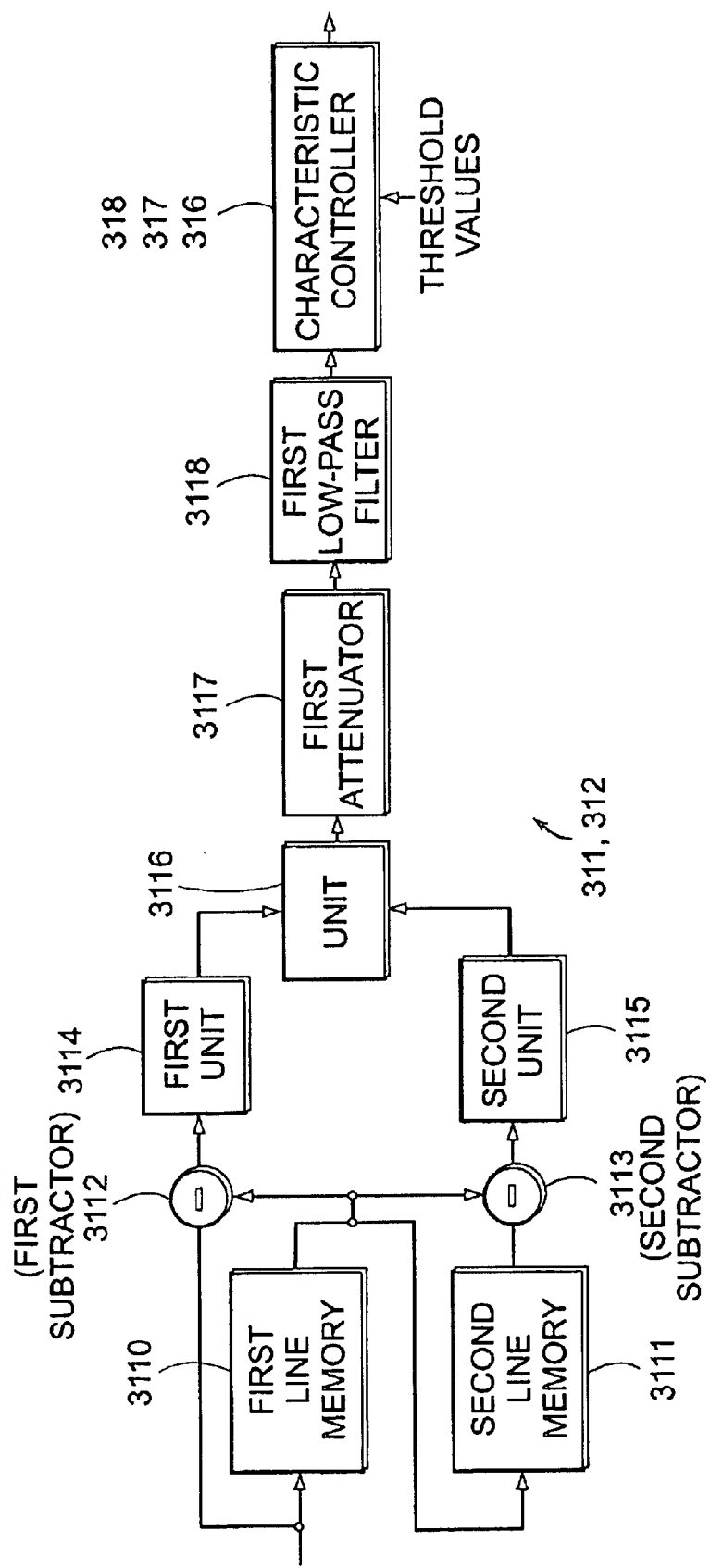
FIG. 3 shows a block diagram of components of the first device.

The first and second circuit units 311 and 312, respectively, for forming line differences are shown in detail in FIG. 3. Each of these two circuit units comprises in each case one first mine memory 3110 which is connected to the input and to whose output a second line memory 3111 is connected. Furthermore, a first subtractor 3112 is provided, which is connected to the input of the circuit unit and to the output of the first line memory 3110. A second subtractor 3113 is connected to the output of the first line memory 3110 and to the output of the second line memory 3111. The output of the first subtractor 3112 is connected to a first unit 3114 for magnitude formation, while the output of the second subtractor 3113 is connected to a second unit 3115 for magnitude formation. The outputs of the first and second units for magnitude formation are jointly connected to a unit 3116 for maximum-value determination, whose output signal is supplied via a first attenuator 3117 and a first low-pass filter 3118 following it, to the characteristic controller 316, to which threshold values are applied.

Figure 4:
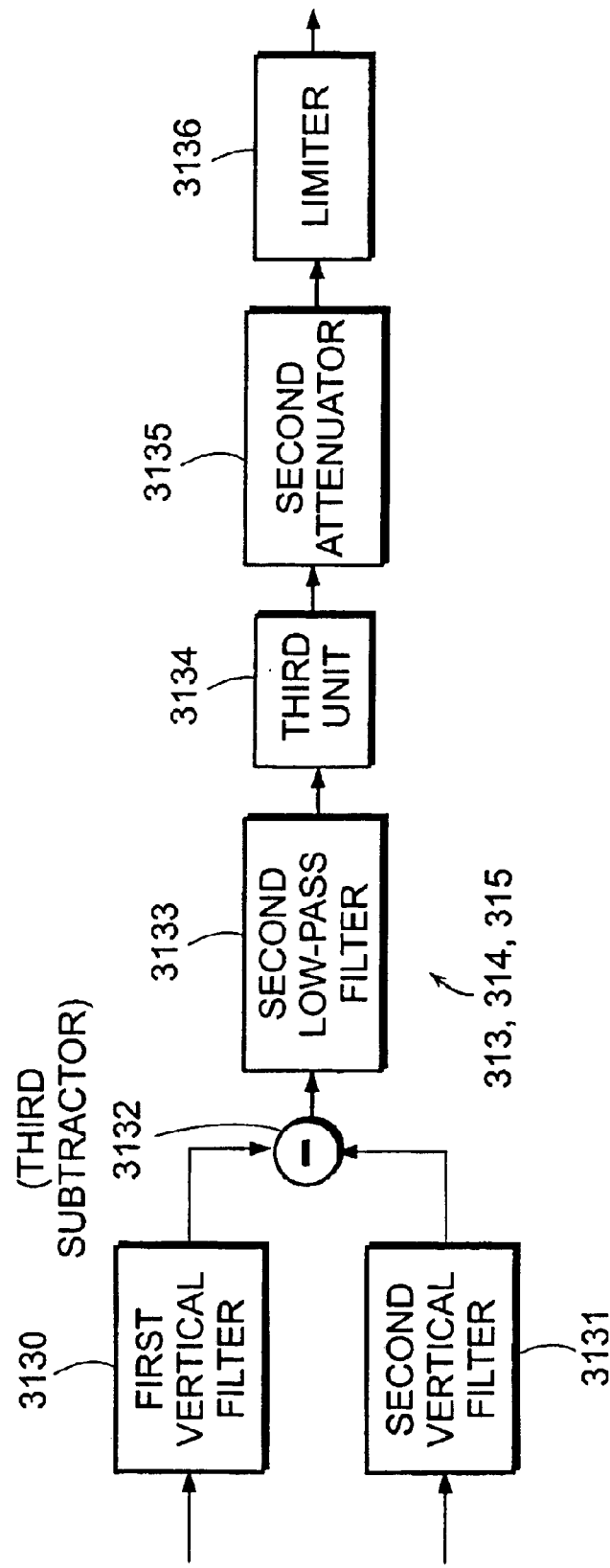
FIG. 4 shows a block diagram of further components of the first device.

FIG. 4 shows, in detail, the construction of the circuit units 313, 314, 315 for producing frame differences. These have a first and a second vertical filter 3130, 3131, whose outputs are connected to a third subtractor 3132. The output of the third subtractor 3132 is connected to the input of a second low-pass filter 3133. Its output signal is supplied to a limiter 3136, via a third unit 3134 for magnitude formation and via a second attenuator 3135 following it.

Fields in a different raster position are in each case processed in the first and third circuit units 313, 315. This takes account of the fact that the vertical filters 3130, 3131 shift the raster position so that, after this, the two fields are in the same raster position. In contrast, fields in the same raster position are processed in the second circuit unit 314. In this case, only low-pass filtering is carried out in the vertical direction. The raster position in this case remains unchanged.

The second device 32, using which the pixel motion signals for producing motion values are corrected or subsequently processed, is shown in detail in FIG. 5 and will be explained with reference to FIGS. 6a to 6h. This subsequent processing is carried out in a number of steps.

A first correction unit 321 carries out first deletion (horizontal processing) of individual pixel motion signals which are in the first state (moving) in a surrounding area or pixel motion signals which are in the second state (stationary). Specifically, in this case, there is a high probability that this represents incorrect classification by the first device 31, since moving objects generally have a larger extent. In order to correct this state, a mask is placed over the entire picture and a decision is made for each pixel motion signal as to whether it will or will not be deleted. The mask is shown schematically in FIG. 6a:

The present pixel motion signal A with the first state is deleted or changed to the second state if all the surrounding signals a, b and c indicate the second state. The corrected signal A becomes the point b on correction of the subsequent signal, that is after shifting the mask one pixel to the right. The corrected value at the point A is likewise used as a for correction of the signal which is located exactly under the signal A. This means that, once the values have been calculated, they are used recursively once again as input values for the subsequent corrections. This means that the deletion algorithm operates very effectively.

A second correction unit 322 is used for deleting lines (vertical processing). In this case, a subsequent block in each case deletes individual horizontally running lines. The correction is once again carried out for each pixel. The mask which is used is shown in FIG. 6b:

The pixel motion signal A of the present pixel is changed to the second state if the signals in one and two lines above and one line below are in the second state. Non-recursive processing is used in this case.

A third correction unit 323 then carries out initial insertion of pixel motion signals (horizontal processing), with the corresponding mask being shown in FIG. 6c:

After the first two steps, there are still individual set pixel motions signals with an extent of two pixels in the horizontal direction. These will be deleted later by a fourth correction unit 324. However, within moving objects, there are also groups of two which, of course, must not be deleted. Since the corresponding pixels are located within relatively large moving objects, there are always a number of pixel motion signals in the first state in their immediate vicinity. The deletion process can therefore be prevented by filling the gaps between them with pixel motion signals in the first state. This is done by the third correction unit 323 by considering the horizontally adjacent pixel motion signals a, b, c and d. If one of the signals a or A is set, and one of the signals b, c, d is set at the same time as well, then the present pixel motion signal is changed to the first state. This algorithm operates recursively, that is to say the result of the correction is used as point a for the next correction.

The fourth correction unit 324 carries out a second deletion of pixel motion signals (horizontal processing). This process is illustrated in FIG. 6d. The present pixel motion signal A is assigned to the second state if none of the surrounding pixel signals a, b, c, d is in the first state. This algorithm also operates recursively.

A fifth correction unit 325 expands the pixel motion signals (horizontal processing). This is illustrated in FIG. 6e. This step results in an area of pixel motion signals which are in the first state in each case being enlarged by one pixel at the right and left-hand edges in the horizontal direction. A simple OR logic operation on the three motion signals a, A and b can be used for this purpose. Processing in this case is not recursive.

Then, according to FIG. 6f, a sixth correction unit 326 carries out line expansion (vertical processing) with the areas which are in the first state being enlarged by one line in the vertical direction.

A seventh and an eighth correction unit 327 and 328 now homogenize the moving areas by inserting pixel motion signals in the first state. The previous steps have resulted in undesired motion signals having been eliminated so that inhomogeneous moving picture areas can now be filled in in a broadbrush manner.

The seventh correction unit 327 carries out a second insertion process for pixel motion signals, and this is shown in FIG. 6g. This step operates in the horizontal direction. If the already processed value a or the present value A is set and one of the values b, c, d, e, f, g or h is set at the same time, the present value is assigned to the first state. Processing is carried out recursively.

Finally, the eighth correction unit 328 inserts lines (vertical processing). This is illustrated in FIG. 6h. The present pixel motion signal A is assigned to the first state if two values are set in one of the first two lines and two values are at the same time set in one of the following tour lines. Processing is carried out recursively in this case as well. The values a, b, c and d are thus already corrected values.

Overall, the pixel motion signals are consequently corrected such that motion values are produced which define homogeneous picture areas which are clearly delineated from one another and are defined either cohesively as being moving or as being stationary.

What is claimed is:

1. Circuit for frame rate conversion in a video signal reproduction device using a motion-adaptive method, having a motion detector for producing motion values of pixels by means of which a device for switching a field sequence with the frame rate being doubled can be actuated, wherein the motion detector comprises a first device for producing pixel motion signals, which have a first state for each pixel which is found to have moved and a second state for each pixel which is found to have been stationary, and a second device by means of which the pixel motion signals are corrected in order to produce motion values in such a manner that a state of a pixel which differs from matching states of adjacent pixels is ignored.

2. Circuit according to claim 1, wherein in order to determine the first or second state, the first device has units for producing controlled characteristics for assessment of field differences as a function of line differences, with the motion sensitivity being varied depending on a magnitude of the line differences.

3. Circuit according to claim 2 wherein the first device has circuit units for forming line and field differences, with the field difference being assessed by the units for producing line differences are applied and being mapped onto 1-bit signals, and these 1-bit signals being logically combined by an OR gate in order to produce the pixel motion signals.

4. Circuit according to claim 3 wherein the third, fourth and the fifth circuit unit are used to produce three field differences from a first, a second and a third field, and in that the units for producing controlled characteristics are controlled using the maximum of the line difference signals from the first and second field.

5. Circuit according to claim 1 wherein the second device comprises a correction unit for processing the motion signals of each pixel in such a manner that the first state is corrected to the second state if the motion signals of all the adjacent pixels are in the second state, with a previously corrected state being used for the processing of a subsequent pixel.

6. Circuit according to claim 1 wherein the second device comprises a correction unit for processing all the motion signals in a line in such a manner that the first state is changed to the second state if the motion signals in one and two lines above and in one line underneath are in the second state.

7. Circuit according to claim 6 wherein the second device comprises further correction units by means of which moving picture areas are homogenized by insertion of motion signals which are in the first state.

* * * * *